US008023418B2

(12) United States Patent
Curley

(10) Patent No.: US 8,023,418 B2
(45) Date of Patent: Sep. 20, 2011

(54) METHOD AND APPARATUS FOR TESTING A BROADBAND INTERNET CONNECTION

(75) Inventor: Jon Paul Curley, Cardiff (GB)

(73) Assignee: Epitiro Limited, Cardiff (GB)

( * ) Notice: Subject to any disclaimer, the term of this patent is extended or adjusted under 35 U.S.C. 154(b) by 155 days.

(21) Appl. No.: 12/466,906

(22) Filed: May 15, 2009

(65) Prior Publication Data

US 2010/0290349 A1 Nov. 18, 2010

(51) Int. Cl.
 *G06F 11/00* (2006.01)
(52) U.S. Cl. ......... 370/247; 370/252; 370/248; 370/250
(58) Field of Classification Search .................. 370/241, 370/352, 216, 401, 252, 244, 245, 247–250; 709/217, 227; 379/27.01, 27.04, 29.02; 398/17, 398/1
See application file for complete search history.

(56) References Cited

U.S. PATENT DOCUMENTS

| 7,558,211 B2* | 7/2009 | Cahn | 370/241 |
| 7,640,020 B2* | 12/2009 | Gutowski | 455/452.2 |
| 7,796,526 B2* | 9/2010 | Miller | 370/241 |

\* cited by examiner

*Primary Examiner* — Ricky Ngo
*Assistant Examiner* — Chandrahas Patel
(74) *Attorney, Agent, or Firm* — Jackson Walker L.L.P.; Christopher J. Rourk

(57) ABSTRACT

An embodiment of the invention provides a method of testing a broadband internet connection including the steps of transmitting test signals via a broadband internet connection to a cellular network core, the test signals representative of those sent by an access point base station, measuring and recording a property relating to the transmission of the test signals, comparing the property to a minimum acceptable level and thereby determining whether the broadband internet connection is suitable for providing an access point base station.

20 Claims, 3 Drawing Sheets

METHOD AND APPARATUS FOR TESTING A BROADBAND INTERNET CONNECTION

BACKGROUND OF THE INVENTION

This invention relates to a method and apparatus for testing a broadband internet connection, in particular, but not limited to, the suitability of the broadband internet connection for providing access point base station services.

An access point base station is a cellular base station designed for use in residential or small office environments. A user's mobile phone communicates with the access point base station with a radio transmission, and the access point base station connects to a broadband internet connection in the home or office which it then uses as a two-way communications path to the cellular operator's core network.

There are several advantages to using an access point base station service. 3 G suffers from inadequate indoor signal penetration, leading to poor coverage in an indoor environment, which is where mobile phone users are believed typically to spend two-thirds of their time. Poor coverage diminishes the quality of voice and video applications and slows down high-speed data services. Dropped calls, poor video quality and time-consuming downloads lead to user dissatisfaction, as they expect high quality of service. They may resort to using their land-line phones or switch to other cellular operators in the hope of better quality of service including clearer voice calls, clearer video images and faster downloads.

The use of an access point base station in the home or office improves the radio coverage and capacity of a cellular network, and also increases the potential for new cellular services. Furthermore, the use of an access point base station reduces investment requirements in the macro radio cellular infrastructure.

When using a home back haul connection, an access point base station typically shares the bandwidth of the connection with other active services on that connection. For example, these may include services such as Internet Browsing, On-line Gaming Sessions, Video-on-Demand, IPTV, Peer-to-peer file sharing sessions and potentially a whole host of other services or activities. It is important that the broadband internet connection is capable of handling the data sent by the access point base station in a fast and accurate manner. This is particularly important for cellular services such as voice and video calling, where a delay or degradation of the signal results in the call failing or not being understood.

It will be appreciated that the usage profile of one individual premises and the associated broadband internet connection when compared to another individual premises and broadband internet connection can vary greatly. Furthermore, the underlying quality of the broadband internet connection can vary considerably, in dependence on such factors as allocated bandwidth (Mb/s), distance from the exchange, age of the copper in the ground, internet service provider traffic management policies, network load by time-of-day and the efficiency of routing in the network path from the customer premises to the core network.

Any or all of these elements combined may create a situation where the broadband internet connection is not suitable for access point base station service, leading to an unsatisfactory performance as mentioned above. In such shared-bandwidth approaches, which are the majority of designs currently being developed, the detrimental effect on the quality of access point base station delivered services could be such as to make a deployment unfeasible.

SUMMARY OF THE INVENTION

The present invention seeks to mitigate or overcome one or more of the above-identified disadvantages. In particular, but not exclusively the invention seeks to provide an apparatus and method of assessing the suitability of a broadband internet connection for an access point base station deployment in advance of physical hardware deployment. The invention provides a method of testing a broadband internet connection for suitability for providing an access point base station service, wherein the method comprises the steps of: installing a test program onto a computer connected to the broadband internet connection; the computer, under the control of the test program, transmitting test signals via the broadband internet connection to a cellular network core; the test signals being representative of those transmitted by an active access point base station; measuring and recording at least one property relating to the transmission of the test signals; comparing the property to a minimum acceptable level; and thereby determining whether or not the broadband internet connection is suitable for providing an access point base station. In order that the test signals are representative of those transmitted by an access point base station, the signals should be arranged such that they are treated by the broadband internet connection, the internet and the cellular network core in the same way as if they were signals transmitted by an access point base station.

Advantageously, the invention provides a method of assessing the performance of a broadband internet connection when connected to an access point base station without requiring the actual installation of an access point base station.

Advantageously, testing the broadband internet connection in this way enables the performance of the connection to be measured before installation of an access point base station. Preferably, the method is used to prevent access point base stations being connected to unsuitable broadband internet connections. Alternatively, or additionally, the user of an access point base station may be told of the expected performance of the access point base station prior to its installation.

Preferably, for the broadband internet connection to be suitable for use with an access point base station, the performance when four concurrent voice calls are being routed through the access point base station are of equivalent quality to those calls being made using the usual macro radio network.

The traffic requirements for determining whether or not the broadband internet connection is suitable for providing an access point base station service may be determined based on the broadband technology in use and the location of the broadband internet connection.

The cellular network core may include a dedicated hardware device for receiving the test signals transmitted by the computer. The dedicated hardware device may include measuring and recording devices to measure and record properties relating to the test signals transmitted to it.

The method may further comprise the step of a signal being sent from the cellular network core to the computer connected to the broadband internet connection. The dedicated hardware device may be arranged to send back test signals to the computer connected to the broadband internet connection.

The signal may be representative of those received by an active access point base station.

The test signals sent and/or received by the computer are preferably assured-rate packet transmissions representing typical voice and video calling sessions. The signals are preferably sent using real Secure Real Time Transport Protocol (SRTP) or Internet Protocol Security (IPSec) frames sent at standard frame rates over User Datagram Protocol (UDP) with Real Time Transport Protocol (RTP) ports. Thus, the test signals may be treated by the network in the same way as a typical voice and video calling session.

The test program may be arranged to transmit signals via the computer in accordance with a predetermined pattern, over a predetermined amount of time. The test signals may, for example, be sent every 15 minutes over a period of two or three weeks. In such a way, the test program can build up a picture of how an access point base station would operate using the broadband internet connection under a varying set of conditions. The computer program may connect to a network-hosted configurator in order to obtain the required test scheduling. The network may be the internet.

The test program may measure and record a property relating to the test signals and periodically send the results to a web-hosted performance database.

To provide an accurate measurement of how an access point base station may perform through a broadband internet connection, preferably the quality of transmission in both directions, from the computer across the broadband internet connection to the dedicated hardware device in the cellular core and from the dedicated hardware device in the cellular core, across the internet, and back to the computer is investigated. The method may include the measurement and recording of the transmission speed of the signals, the packet loss, the packet latency, or the packet jitter.

Preferably, if the broadband internet connection is found to be suitable for an access point base station, an access point base station is installed.

The invention also provides a system for testing a broadband internet connection, comprising a computer connected to the broadband internet connection, a cellular network core, and a data measuring and recording device, wherein the computer is arranged to send test signals representative of those sent by an access point base station via the broadband internet connection to the cellular network core and the data measuring and recording device is arranged to measure and record properties relating to those test signals.

DESCRIPTION OF THE DRAWINGS

By way of example, certain embodiments of the invention will now be described, of which FIG. 1. is a network overview diagram showing an Access Point Base Station in the typical small office or consumer environment.

DETAILED DESCRIPTION

Figure 1:
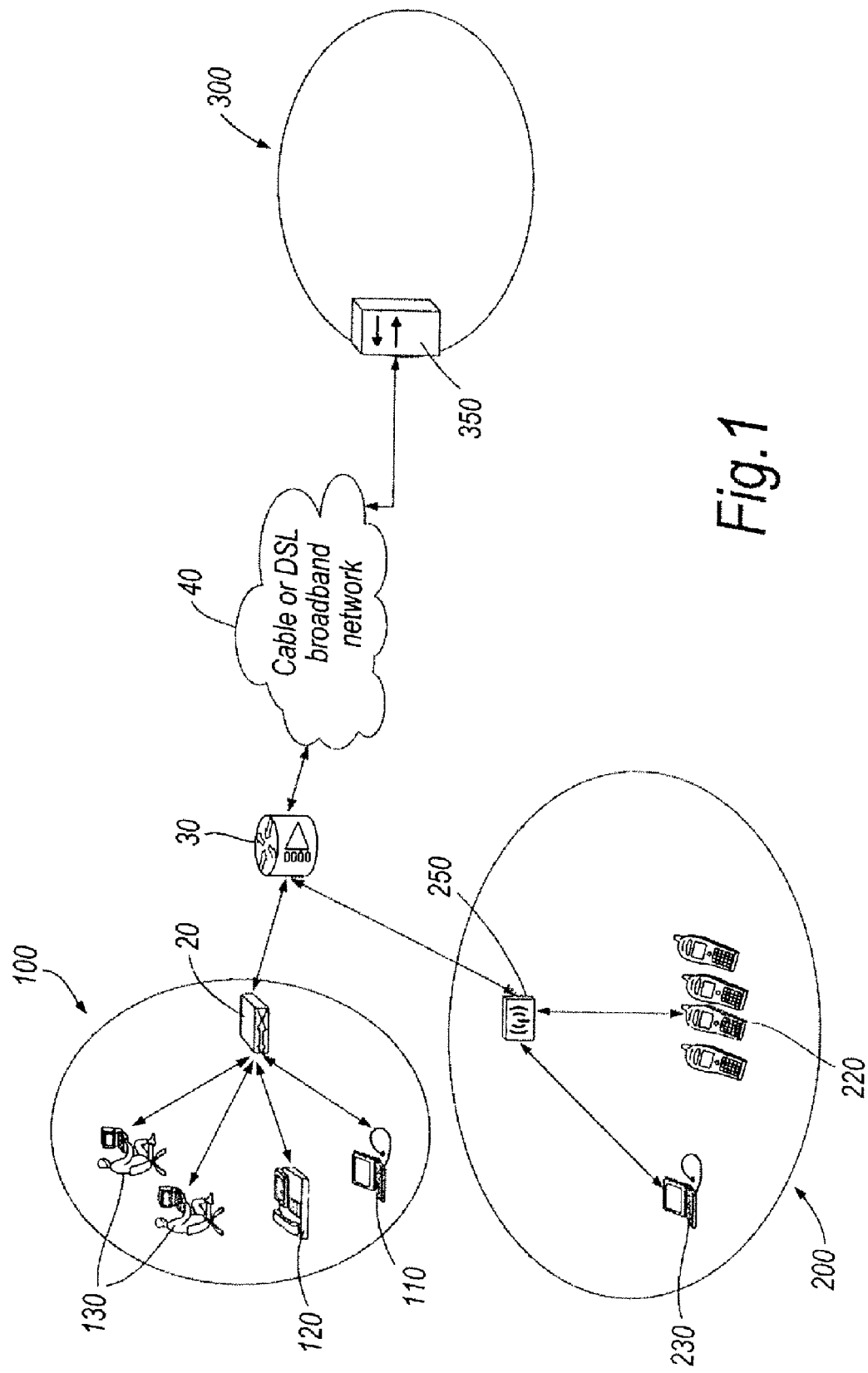

FIG. 1 shows a typical access point base station network. A consumer premises 100 is connected to the Internet via broadband service 40. This service is usually based on a either a DSL or Cable connection entering the home and terminating in a broadband router 30. The router 30 is typically accessed via a switch 20 which allows multiple devices to connect to the Internet and utilize the bandwidth available from the router 30 to the Internet. Typical devices include, but are not limited to, the following types of items laptop PC 110, VoIP Telephone 120, and users connected to the Internet for browsing, files sharing or other connected services 130. There are a whole range of other IP-based devices, not depicted here, that could also be connected and utilize this connection.

Also in the diagram we depict a typical access point base station deployment 200. In this environment the access point base station 250, which can be implemented in hardware or a suitable combination of hardware and software, such as software operating on a general purpose computing platform, is also connected to the broadband router 30 and shares that same Internet broadband connection. The access point base station 250 supports the connection of multiple cellular handsets 220 via a radio spectrum link. This link is typically UMTS but, as stated previously can include other radio protocols. The access point base station 250 is also shown depicting support for a connection of a Laptop PC 230 via a radio spectrum link. This link is typically 2.5 or 3 G, but, as stated previously can include other radio protocols. By connecting to the access point base station and utilizing the communicating services it offers, the handsets 220, Laptop PC 230, and any other connected devices, may transmit traffic across cable or Broadband DSL network 40, via an access point base station network gateway 250 and link into the Cellular providers core network 300. In doing so, and with available bandwidth requirements on the Cable or DSL Broadband network 40, these devices may access and perform typical voice and video services including national and international cellular calls, national and international video calling and typically Internet connectivity without using the traditional radio network.

Considering the transmission process in greater detail, in an access point base station network voice and video signals are transmitted from the cellular handset 220 to the access point base station 250 typically in a radio-specific format, generally Universal Mobile Telecommunications System (UMTS), and converted and compressed for suitability for transmission over a packet network. The most popular method being UMTS, there are also other applicable formats of communication including Global System for Mobile Communication (GSM), Code Division Multiple Access 2000 (CDMA-2000), Time Division Synchronous Code Division Multiple Access (TD-SCDMA) amongst others. Typically these packets are secured for transport using either IPSec or SRTP. IPSec is a set of protocols for securing communications by encrypting packets in the stream. STRP defines a profile of Real-time Transport Protocol (RTP) intended to provide encryption, authentication, integrity and replay protection to the RTP data.

Once the packets have been prepared they are transmitted across the fixed-line broadband network 40 and into the cellular network core 350, which can be implemented in hardware or a suitable combination of hardware and software, such as software operating on a general purpose computing platform, where they are subject to the standard distribution processes typical in a cellular network. As mentioned above, in offering an access point base station service to a consumer, the cellular operator preferably should be able to provide a level of service when four concurrent voice calls are being routed through the access point base station of equivalent quality as if those calls were being made using the usual macro radio network.

Figure 2:
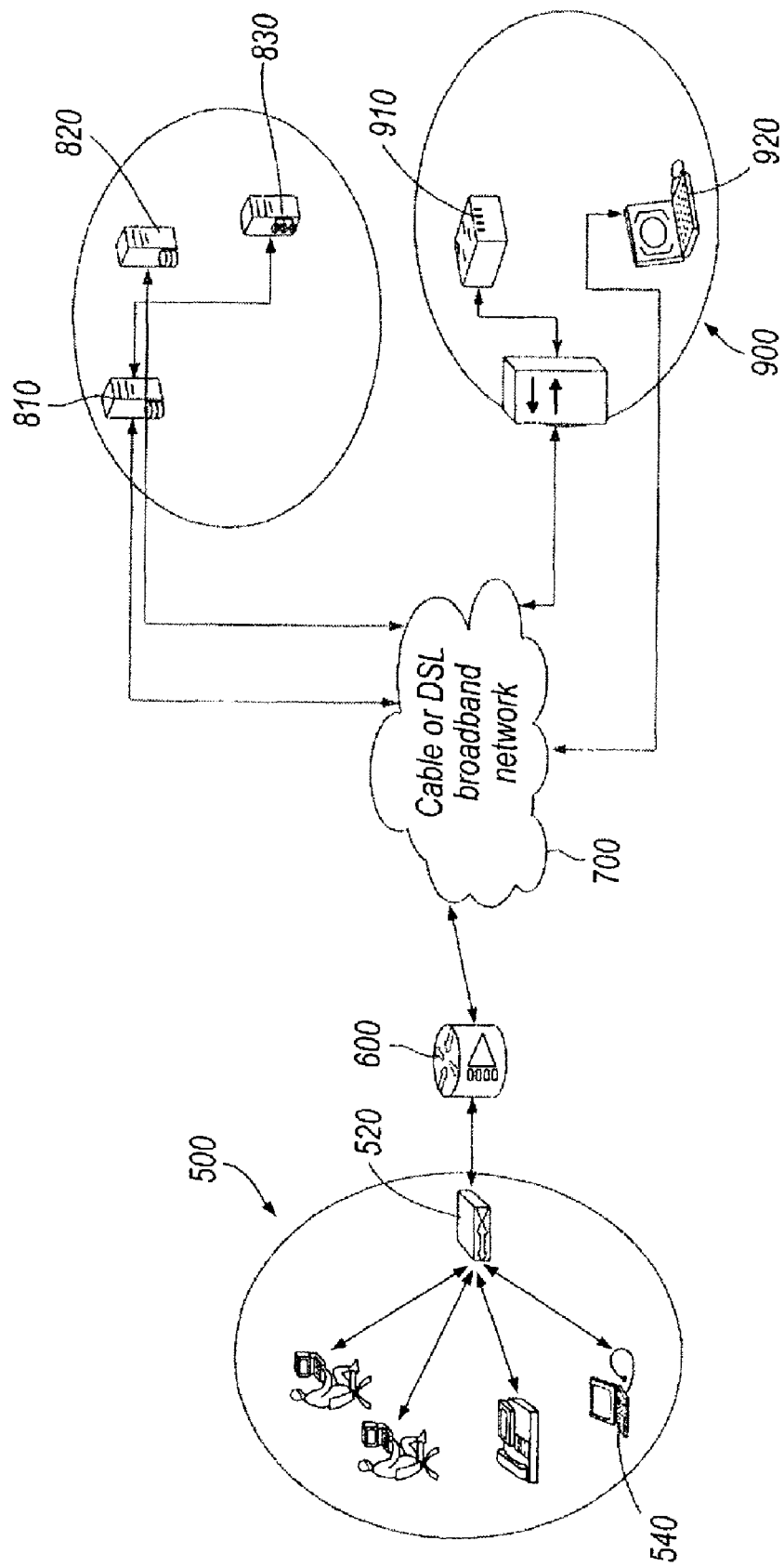
FIG. 2. is network overview diagram showing the invention as applied to a typical small office or consumer environment.

FIG. 2 shows a typical consumer premises pre-deployment of an access point base station service and including the proposed infrastructure to support the present invention. The framework of the invention comprises a consumer PC 540 connected to the broadband network 700 and located at the premises under test 500. A broadband network connection is presumed active at the premises connected via a broadband router 600. Dedicated hardware devices in the cellular network core 900, utilizing the proposed access point base station back haul path, generate specific traffic types and also measure the network characteristics of those transmissions to determine the suitability of any individual broadband network for access point base station based Voice, Data and Video-based services. The framework further includes a network-hosted reporting database 820 for storing performance results, an internet hosted application server 810 for report storage, retrieval and display of the performance results, an internet hosted configuration server 830 to manage scheduling of test cycles of the software agent residing on the consumer's PC 540, and a PC running an internet browser 920 connected to the internet, capable of accessing the internet hosted application server 810 to display results of each consumer premises 500.

The elements of the invention operate as follows. The consumer premises 500 is connected to the internet via broadband service. This service is usually based on either a DSL or Cable connection entering the home and terminating in a broadband router (or modem) 600. This router 600 is typically accessed via a switch 520 which allows multiple devices to connect to the Internet and utilize the bandwidth available from the router 600 to the Internet. Should a user decide that access point base station services would be useful in the premises, upon contacting the cellular operator they are instructed to download a software program onto their PC to begin the pre-deployment testing process.

Upon downloading the testing program from the internet hosted application server 810 for report storage, retrieval and display and having completed an software installation process, the PC 540 is now capable of running specific traffic test patterns at a pre-determined schedule as determined by connecting to the Internet hosted configuration server 830.

The testing program as installed on the computer 540 is capable of generating and receiving packet transmissions with very specific signatures, typically IPSec or SRTP with appropriate Type of Service (ToS) or DiffServ markings in the packet headers and at very specific rates of transmission equivalent to rates would be produced for Voice or Video calling sessions if an access point base station was in place.

The testing program deployed in the consumer's PC 540, initiates scheduled assured-rate packet-transmissions sessions, representing typical voice and video-calling sessions, from the PC 540 via the broadband router 600 across the public internet and terminating the hardware devices 910 in the cellular network core 900. This produces a true simulation using real SRTP or IPSec frames, sent at standard frame rates over UDP with RTP ports. This ensures the quality of service engineering in the network will treat the stream the same as normal IPSec or SRTP traffic—a more effective approach for checking quality of service than using, for example, an ICMP Pinger.

The transmissions typically are representative duplex transmissions between the PC 540 and the cellular network core 900, and are specifically designed to be representative of the traffic relating to voice or video sessions from the cellular handset when converted into a format capable of being transmitted over an all IP broadband network. By "representative" it is meant that the broadband network treats those signals in the same way as it would treat voice or video session being transmitted through an access point base station. Typically these traffic sessions operate at an assured bit rate based on the requirements for 1 call and are incremented for each test by an additive amount up to a maximum limit as defined by the cellular operator. As it may be a requirement that, in offering an access point base station service to a consumer, the cellular operator must be able to provide a level of service for up to 4 concurrent voice sessions as if those calls were being made on the macro radio network, this allows the cellular operator to define a scheduled set of transmissions based on call volumes starting with 1 call and adding traffic requirements each time until the traffic requirements for 4 calls is reached.

The traffic requirements for determining whether or not the broadband internet connection is suitable for connection with an access point base station may be determined based on the broadband technology in use and the location of the broadband internet connection. For example, the following table shows an illustration of the peak bandwidth requirement for multiple voice calls via an access point base station for different encapsulation techniques. The table includes Point to Point Protocol over ATM (PPPoA), which is commonly used in Europe, and Point to Point Protocol over Ethernet (PPPoE) which is commonly used in North America. The table shows the requirements for signals sent using real Secure Real Time Transport Protocol (SRTP) or Internet Protocol Security (IPSec) frames.

| | Peak bandwidth requirement for multiple voice calls via access point base station - figures are in Kbps | | | |
|---|---|---|---|---|
| | 1 call | 2 calls | 3 calls | 4 calls |
| IPSec based protocol | | | | |
| Europe PPPoA | 64 | 127 | 191 | 254 |
| North America PPPoE | 85 | 170 | 254 | 339 |
| SRTP (Muxed) | | | | |
| Europe PPPoA | 64 | 64 | 85 | 106 |
| North America (PPPoE) | 64 | 85 | 107 | 127 |

During the packet transmissions precise data is collected by the PC 540. A lot of research has been done in the area of packet delivery to provide quality of service definitions for both voice and video sessions in an IP network. Unlike data traffic, voice and video traffic is very intolerant of both delay, delay variation and packet loss. To provide an accurate estimation of the key access point base station services when delivered through a broadband network the quality of the transmission in both directions—from the PC 540 across the public internet and terminating the hardware devices 910 in the cellular network core 900, and the corollary from the hardware devices 910 in the cellular network core 900 across the Internet back to the PC 540—is investigated. During the transmissions the following metrics at both ends of the transmission are captured: transmission speed; packet loss, packet latency and packet jitter. These metrics are key in characterizing the behavior of latency-sensitive usage cases in an access point base station environment for both voice and video sessions.

Packet Loss is a metric that measures packets lost in transmission over a data network between two network endpoints. This metric is typically presented as a percentage.

Packet Latency is a metric that measures the typical time between transmission and the reception of the data packet between the two network endpoints 540 and 910. Latency is typically presented in fractions of a second.

Jitter is an estimate of the statistical variance of data packet inter-arrival time. This will be calculated using the formula presented in section 6.3.1 of RFC 1889 for inter-arrival jitter. Information regarding this formula can be found at http://rfc.net/rfc1889.html In the telephony and video world, a single number is typically given to rate call quality. Data network transmissions have not traditionally been reported on using a single metric, since there are many factors to consider. ITU (International Telecommunication Union) recommendation G.107 introduced the E-model, a standard method of assessing call quality well known to those skilled in the art. The output of an E-model calculation is a single scalar, called an "R factor," derived from delays and equipment impairment factors. Once the R factor is obtained, it can be mapped to an estimated Mean Opinion Score (MOS). The E-model provides a powerful and repeatable way to assess whether a broadband data network is suitable to carry access point base station-based Voice and video calls with acceptable level of quality. This invention may employ the E-model to predict voice and video quality in broadband networks.

This output MOS forms the basis for the assessment of the transmission quality a consumer could expect were an access point base station to be utilized at the premises under test.

The information collected on the test signals is periodically transmitted to central reporting server and database on the internet 820 and stored. By repeating this process on a regular basis (say every 15 minutes as an example) for a prolonged duration of time (say 2 to 3 weeks) the test program establishes a dataset outlining the specific available capacity of each consumer's broadband network, in particular with regards to how the broadband internet connection in question would perform when associated with an access point base station. This dataset is then analyzed to determine whether the broadband internet connection is suitable for use with an access point base station by comparing the dataset to predetermined minimum performance values. If the broadband internet connection is suitable for use with an access point base station, an access point base station may be installed. The dataset may also be used to advise a potential user of the performance they can expect if they install an access point base station.

A Pre-deployment Report may be produced which provides a browser-based report in PDF format that automatically includes all of the test results, making recommendations on access point base station limits for each test premises and showing the impact of using different back haul choices. Additionally the report can include information to inform a potential user's expectations regarding the quality of those services and number of concurrently supported calls or video sessions the user can reasonably expect.

Figure 3:
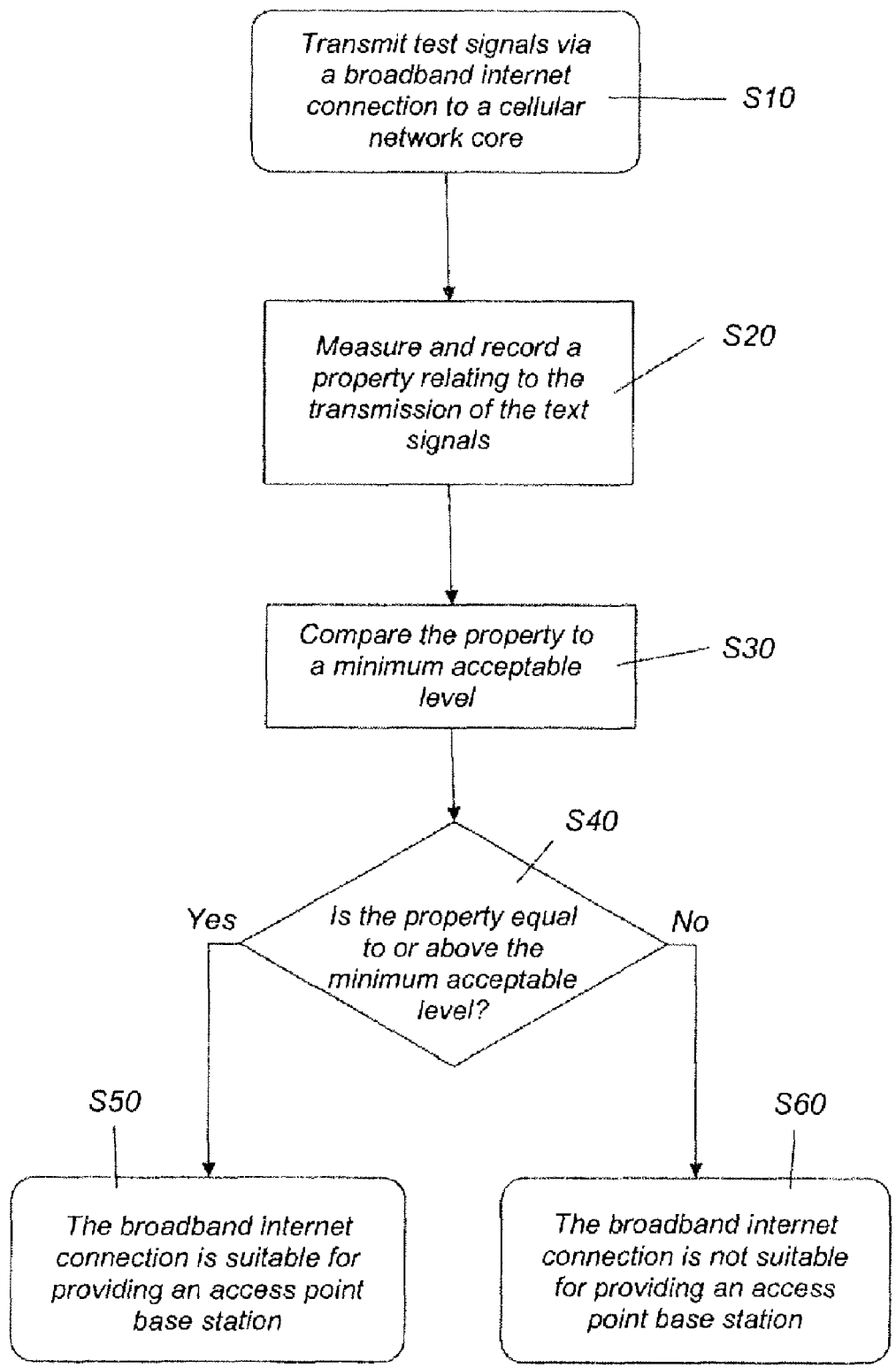
FIG. 3 is a flow chart showing steps taken according to an embodiment of the invention.

FIG. 3 is a flow chart showing the steps taken by a system according to the invention when testing a broadband internet connection. The flow chart of FIG. 3 discloses an algorithm that can be implemented on the general purpose computing platforms of the systems disclosed in FIGS. 1 and 2, either alone or in combination with additional algorithms or steps. S10 shows the step of transmitting a test signal via a broadband internet connection to a cellular network core, such as from a consumer's PC 540 to cellular network core 900, or in other suitable manners. For example, PC 540 may execute an algorithm that causes a predetermined test signal to be transmitted to cellular network core 900. The system, such as PC 540, measures and records S20 a property relating to the transmission of the test signals. For example, cellular network core 900 may execute an algorithm to measure and record a property such as transmission speed, packet loss, packet latency and packet jitter. The system then compares S30 the measured and recorded property value to a stored minimum acceptable property value level, such as a value for transmission speed, packet loss, packet latency or packet jitter that has been recorded in a data memory, and examines S40 whether it is equal to, or above, the minimum acceptable level, using a suitable algorithm or algorithms, such as by assigning the measured property value to a first variable, assigning the stored property value to a second variable and performing a suitable process for determining whether the first variable is equal to or greater than the second variable. If the property is equal to or above the minimum acceptable level the broadband internet connection being tested is suitable for providing an access point base station S50. A suitable variable associated with the broadband internet connection being tested can then be set to a predetermined value, such as a value that represents that the broadband internet connection has been tested and has successfully passed the test. If the property is lower than the minimum acceptable level, the broadband internet connection being tested is not suitable for providing an access point base station S60, and a suitable variable associated with the broadband internet connection being tested can then be set to a predetermined value, such as a value that represents that the broadband internet connection has been tested and has not successfully passed the test. In this manner, the suitability of the broadband internet connection for providing an access point base station can be determined by referencing the variable associated with the access point base station, such as by storing the variable in a data memory.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of testing a broadband internet connection for suitability for providing an access point base station service, wherein the method comprises the steps of:
    installing a test program onto a computer connected to the broadband internet connection;
    the computer, under the control of the test program, transmitting test signals via the broadband internet connection to a cellular network core;
    the test signals being representative of those transmitted by an active access point base station;
    measuring and recording at least one property relating to the transmission of the test signals;
    comparing the property to a minimum acceptable level;
    thereby determining whether or not the broadband internet connection is suitable for providing an access point base station; and
    installing an access point base station should the broadband internet connection be determined to be suitable.

2. A method as claimed in claim 1, wherein the cellular network core includes a dedicated hardware device for receiving the test signals transmitted by the computer.

3. A method as claimed in claim 1, further comprising the step of a signal being sent from the cellular network core to the computer connected to the broadband internet connection.

4. A method as claimed in claim 3, wherein the signal is representative of those received by an active access point base station.

5. A method as claimed in claim 1, wherein the test program is arranged to transmit signals via the computer in accordance with a predetermined pattern, over a predetermined amount of time.

6. A method as claimed in claim 1, wherein the computer, under the control of the test program, connects to a network-based configurator to provide the test signal scheduling.

7. A method as claimed in claim 1, wherein the computer measures and records at least one property relating to the test signal and periodically sends the results to a network-based performance database.

8. A method as claimed in claim 1, wherein the at least one property that is measured and recorded is a transmission speed of the test signals.

9. A method as claimed in claim 1, wherein the at least one property that is measured and recorded is the packet loss of the test signals.

10. A method as claimed in claim 1, wherein the at least one property that is measured and recorded is the packet latency of the test signals.

11. A method as claimed in claim 1, wherein the at least one property that is measured and recorded is the packet jitter of the test signals.

12. A method of testing a broadband internet connection for suitability for providing an access point base station service, wherein the method comprises the steps of:
   installing a test program onto a computer connected to the broadband internet connection;
   the computer, under the control of the test program, transmitting test signals via the broadband internet connection to a cellular network core;
   the test signals being representative of those transmitted by an active access point base station;
   measuring and recording at least one property relating to the transmission of the test signals;
   comparing the property to a minimum acceptable level;
   thereby determining whether or not the broadband internet connection is suitable for providing an access point base station; and
   installing an access point base station should the broadband internet connection be determined to be suitable, wherein the at least one property that is measured and recorded is the packet latency of the test signals or the packet jitter of the test signals, and the test program is arranged to transmit signals via the computer in accordance with a predetermined pattern, over a predetermined amount of time.

13. A method as claimed in claim 12, wherein the cellular network core includes a dedicated hardware device for receiving the test signals transmitted by the computer.

14. A method as claimed in claim 12, further comprising the step of a signal being sent from the cellular network core to the computer connected to the broadband internet connection.

15. A method of testing a broadband internet connection for suitability for providing an access point base station service, wherein the method comprises the steps of:
   installing a test program onto a computer connected to the broadband Internet connection;
   the computer, under the control of the test program, transmitting test signals via the broadband internet connection to a cellular network core, wherein the cellular network core includes a dedicated hardware device for receiving the test signals transmitted by the computer;
   the test signals being representative of those transmitted by an active access point base station;
   measuring and recording at least one property relating to the transmission of the test signals;
   comparing the property to a minimum acceptable level;
   thereby determining whether or not the broadband internet connection is suitable for providing an access point base station;
   installing an access point base station should the broadband internet connection be determined to be suitable; and
   wherein a signal is sent from the cellular network core to the computer connected to the broadband internet connection.

16. A method as claimed in claim 15, wherein the computer, under the control of the test program, connects to a network-based configurator to provide the test signal scheduling.

17. A method as claimed in claim 15, wherein the computer measures and records at least one property relating to the test signal and periodically sends the results to a network-based performance database.

18. A method as claimed in claim 15, wherein the at least one property that is measured and recorded is a transmission speed of the test signals.

19. A method as claimed in claim 15, wherein the signal is representative of those received by an active access point base station.

20. A method as claimed in claim 15, wherein the test program is arranged to transmit signals via the computer in accordance with a predetermined pattern, over a predetermined amount of time.

* * * * *